United States Patent [19]  
Eilrich et al.

[11] Patent Number: 5,029,954  
[45] Date of Patent: Jul. 9, 1991

[54] KALEIDOSCOPE

[75] Inventors: Mark W. Eilrich, Sonora, Calif.; Hazel O. Baker, Bethesda, Md.

[73] Assignee: WildeWood Creative Products, Sonora, Calif.

[21] Appl. No.: 607,373

[22] Filed: Oct. 31, 1990

[51] Int. Cl.⁵ .............................................. G02B 23/00
[52] U.S. Cl. .......................................... 350/4.2; 353/2
[58] Field of Search ................ 350/4.1, 4.2; 353/1, 353/2

[56] References Cited

U.S. PATENT DOCUMENTS

| | | | |
|---|---|---|---|
| 1,010,808 | 12/1911 | Scheufler | 350/4.1 |
| 2,298,966 | 10/1942 | Quackenbush | 350/4.2 |
| 3,383,150 | 5/1968 | Powers | 350/4.2 |
| 3,567,306 | 3/1971 | Spear | 350/4.1 |
| 3,738,036 | 6/1973 | Landsinger et al. | 350/4.2 X |
| 3,748,013 | 7/1973 | Orans | 350/4.2 |
| 3,809,879 | 5/1974 | Gonzalez | 350/4.1 |
| 3,885,865 | 5/1975 | Stern et al. | 353/2 |
| 4,172,629 | 10/1979 | Allen | 350/4.1 |
| 4,740,046 | 4/1988 | MacCarthy | 350/4.2 |
| 4,776,653 | 10/1988 | Kaplan | 350/4.1 |

OTHER PUBLICATIONS

Through the Kaleidoscope . . . and Beyond, C. Baker, 1987 Beechcliff Books, Annapolis, Md., p. 159.

Primary Examiner—Richard A. Wintercorn  
Attorney, Agent, or Firm—Poms, Smith, Lande & Rose

[57] ABSTRACT

A kaleidoscope having a removable object tube with inner elongated mirrored planar surfaces. The object tube is of a transparent solid material filled with a clear transparent viscous liquid with a plurality of contrasting color discrete particles therein.

24 Claims, 4 Drawing Sheets

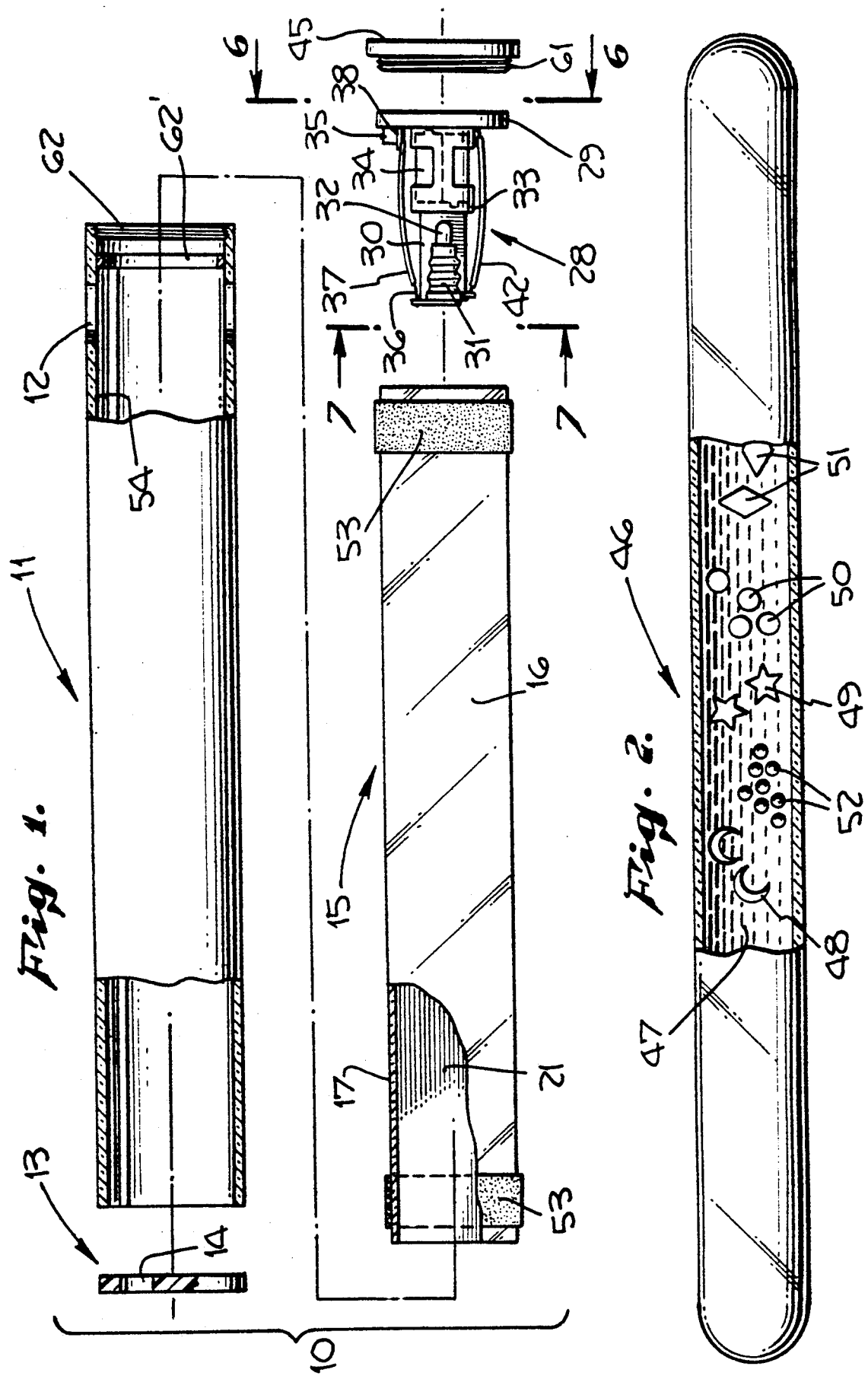

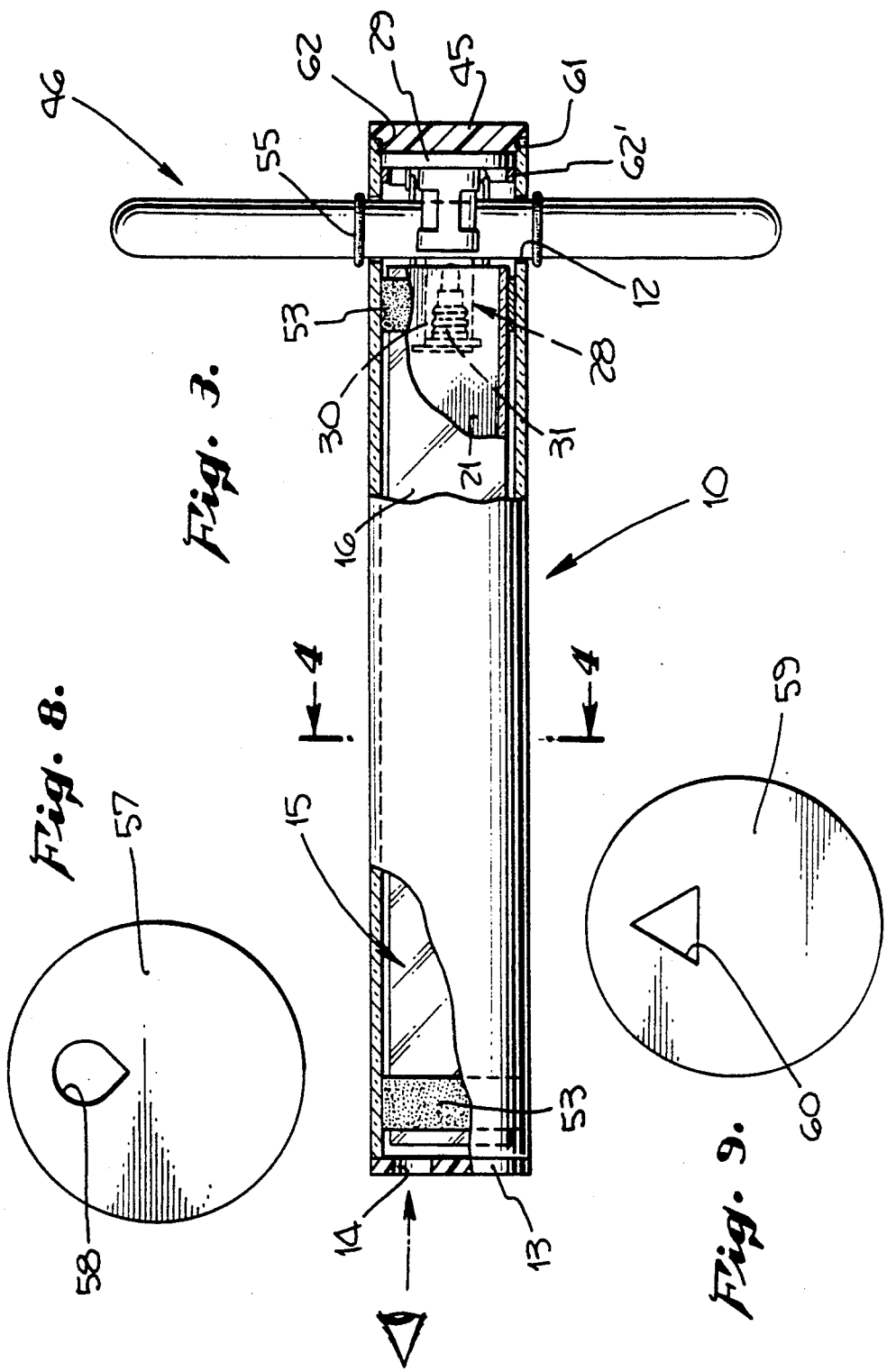

KALEIDOSCOPE

BACKGROUND OF THE INVENTION

1. Field of the Invention

The invention relates to kaleidoscopes and, more particularly, to a self-lighting kaleidoscope having a removable object tube.

2. Description of the Prior Art

Kaleidoscopes have been known in the art for many years. Most of the known kaleidoscopes have fixed object cells on the interior which, upon rotation of the kaleidoscope tube, change the random dispersion of objects in the cell to present different images. Such kaleidoscopes are usually held up to the light, or have artificial light illuminating the same, the light entering the kaleidoscope tube through the object and illuminating the objects from behind so that they are viewable. This method depends on the transparency of the objects to produce an effect. Obviously, such kaleidoscopes cannot be used in the dark. Further, since the object cell is fixed in the tube, the user may quickly become tired of the views presented and lose interest.

One such kaleidoscope is disclosed in U.S. Pat. No. 1,010,808 to Scheufler. The Scheufler patent shows a kaleidoscope having mirrors 20, 21 disposed in a V-shaped arrangement. There is no internal removable sliding object tube nor any light source.

In U.S. Pat. No. 3,020,796 to Kaplan, a stand 10 has a three slanting mirror 21 on the interior of viewing tube 17. A lamp 15 (FIG. 2) is at the bottom of the tube 17. A disk 16 is rotated to produce the object to be viewed. Thus, there is no removable sliding object tube.

In U.S. Pat. No. 3,567,306 to Spear, a kaleidoscope is disclosed having a base 4 and a rotatable disk 5. No light source is provided. In U.S. Pat. No. 4,172,629 to Allen, a kaleidoscope having a light source 28 (FIG. 4) is disclosed. However, objects 7 (FIG. 2b) are viewed externally of the device. In U.S. Pat. No. 3,809,879 to Gonzales, a kaleidoscope is disclosed having a light source 28 (FIG. 4). Materials in gallery 12 are viewed. There is no object tube. Stern, in U.S. Pat. No. 3,885,865, shows another kaleidoscope having a light source 30 and a rotatable object wheel 41 with particulate matter 47 therein. There is no removable object tube. MacCarthy in U.S. Pat. No. 4,740,046 showed a kaleidoscope having V-shaped mirrors with various object cells (see FIGS. 3-9). There is no light or sliding tube. Kaplan, U.S. Pat. No. 4,776,653 shows a kaleidoscope having movable FIGS. 16 (FIG. 1). There is no light or object tube. Orans, in U.S. Pat. No. 3,748,013, has an object area filled with liquid with vanes to blow the same and move objects in the liquid. A light 30 is provided but no sliding object tube.

There thus exists a need for a kaleidoscope having a self-contained light source and a removable fluid filled object tube for viewing discretely colored particles floating in the tube.

SUMMARY OF THE INVENTION

It is an object of this invention to produce a kaleidoscope having a removable object tube and an opaque end cap opposite the viewing end. Light is provided by either ambient light entering the side of the kaleidoscope, or by an internal light source placed in front of the object tube.

It is further an object of this invention to provide a kaleidoscope with a transparent object tube filled with a clear transparent fluid having a plurality of discrete contrastingly colored elements whose movement is both simultaneously upwards and downwards.

These and other objects are preferably accomplished by providing a kaleidoscope having a removable object tube with inner elongated mirrored planar surfaces which may be self lighted. The object tube is of a transparent solid material filled with a clear transparent viscous fluid with a plurality of contrasting color discrete particles therein.

BRIEF DESCRIPTION OF THE DRAWING

FIG. 1 is an exploded view of a kaleidoscope in accordance with the teachings of the invention;

FIG. 2 is a vertical view of an object tube to be used in the assembled kaleidoscope of FIG. 1;

FIG. 3 is a vertical view, partly in section, of the assemble tube and kaleidoscope of FIGS. 1 and 2;

FIGS. 8 and 9 are vertical views of modifications of one of the end caps of the kaleidoscope of FIG. 1.

DESCRIPTION OF THE PREFERRED EMBODIMENT

Figure 4:
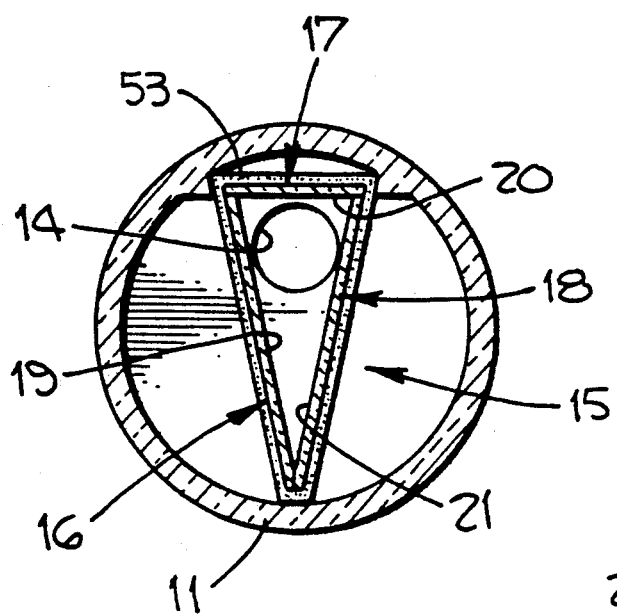
FIG. 4 is a view taken along lines 4—4 of FIG. 3.

Referring now to FIG. 1 of the drawing, a kaleidoscope 10 is shown having a main body portion in the form of a hollow elongated cylindrical tube 11 having a hole 12 therethrough adjacent one end thereof. An end cap 13 (see also FIG. 3) closes off one end of tube 11. A hole 14 is provided through end cap 13.

A mirror assembly 15 is provided which is disposed internally of tube 11 (FIG. 3) extending from a point adjacent end cap 13 to a point adjacent hole 12 (and spaced therefrom). As seen in FIG. 4, mirror assembly 15 is comprised of three elongated mirrors 16 to 18, each mirror being mirrored on the inside surfaces, such as surfaces 19 to 21, respectively thereof with plain glass on the outside thereof.

Figure 5:
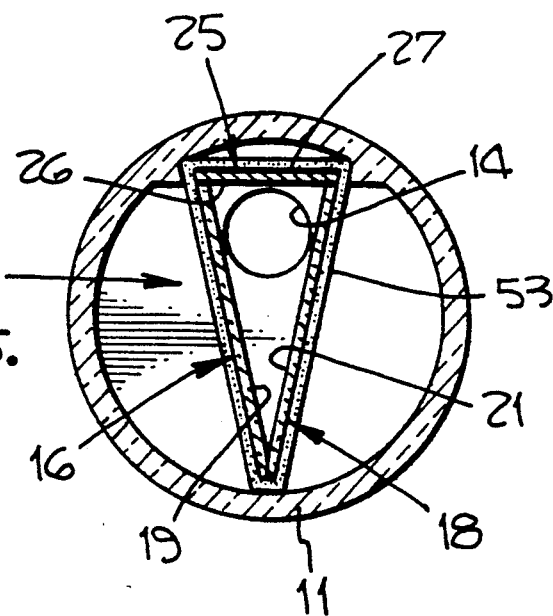
FIG. 5 is a view similar to FIG. 4 showing a modification thereof.

Although all three mirrors are mirrored in the embodiment of FIG. 4, if desired, as seen in FIG. 5 wherein like numerals refer to like parts of the embodiment of FIG. 4, mirror 17 can be replaced by a plastic or cardboard sheet 25 (FIG. 5) which is blackened on both sides 26, 27 to provide a different effect to the kaleidoscope 10.

Figure 7:
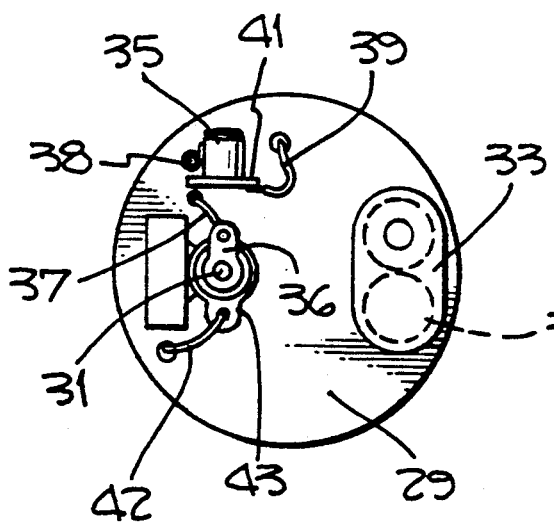
FIGS. 6 and 7 are views taken along lines 6—6 and 7—7, respectively, of FIG. 1.
Figure 6:
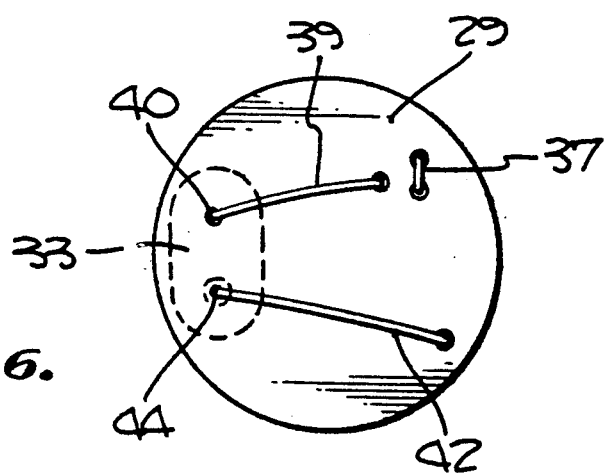

Referring again to FIG. 1, a light assembly 28 is provided having a round plate 29 (FIG. 6) with an elongated extension member 30 having a screw-type bulb housing 31 mounted thereon receiving therein a light bulb 32. A battery holder 33 is mounted on plate 29 having one or more removable batteries 34 mounted therein, such as a pair of 1.5 voltage N batteries. A gravity actuated mercury switch 35 (FIG. 1) is also mounted on plate 29. One lead 36 of bulb housing 31 is coupled via wire conduct 37 to one lead 38 of mercury switch 35. A wire conduit 39 (FIG. 6) is coupled at one end to contact 40 of battery housing 33, as seen in dotted lines in FIG. 6, and at the other end to contact 41 (FIG. 7) of mercury switch 35. A wire conduit 42 (FIGS. 6 and 7) is coupled at one end to the other contact 43 of the bulb housing 31 and at the other end to the other contact 44 of battery housing 33.

An end cap 45 closes off the open end of tube 11, as seen in FIG. 3, having a threaded portion 61' related to the inner diameter of tube 11 so that it threads onto mating threads 62 on the inside wall 54 of tube 11, as seen in FIG. 3. A ring 62' is glued or otherwise formed in the end of tube 11 adjacent cap 45 (see also FIG. 1) providing a stop for plate 29 as will be discussed.

One type of object tube 46 usable in the kaleidoscope 10 is shown in FIG. 2. Tube 46 is of a clear transparent material as acrylic or styrene plastic, or other suitable plastic material, and is hollow on the interior (sealed at both ends) and filled with a clear transparent viscous fluid 47, such as mineral oil. A plurality of discrete particles, such as particles 48 to 51, of differing masses and shapes, are provided floating in liquid 47, in the form of various symbols, such as a crescent shape 48, a star shape 49, a circular shape 50, a triangular shape 51, etc. These particles are preferably made of a reflective material and, in addition to being of different shapes, may be differently colored. The material for the particles 48 to 51 may be metallic, plastic, etc. A phosphorescence material may be used that will glow in the dark for a period of time after exposure to a light source.

In addition to particles 48 to 51, a plurality of extremely small beads 52, such as beads of colored glass or acrylic material, may be provided within tube 46. These beads 52 give the illusion of a dense liquid flowing within tube 46. Beads 52 may be about 0.060" to 0.025" in diameter.

In assembling the device of FIG. 1, the mirror assembly 15 is inserted inside of tube 11 and retained therein, in the position previously discussed, using foam-backed tape as cushioning, and securing assembly 15 by means of an appropriate adhesive, such as a hot melt glue applied to the inner wall 54 of tube 11. End cap 13 is now secured to the open end of tube 11 by any suitable adhesive means, such as by gluing, with eyehole 14 aligned with the interior of the triangular mirror assembly 15 as seen in FIGS. 4 and 5.

Light assembly 28 is now inserted into the end of tube 11 adjacent hole 12 and abuts against ring 62'. End cap 45 is now threaded into the open end of tube 11 into threading engagement with threads 62. Extension portion 30 and bulb housing 31 extend on one side (outside) of mirror assembly 15 and battery housing 33 extends towards the other side (outside) of mirror assembly 15. Threaded portion 61 of cap 45 abuts against plate 29 and holds it in position yet allowing withdrawal of light assembly for bulb or battery replacement. As seen in FIG. 3, the bulb 32 of light assembly 28 extends back toward object tube 46 so that reflected light goes back into the interior of mirror assembly 15.

Object tube 46 is now inserted through hole 12 so that it extends on both sides of tube 11 as seen in FIG. 3. If desired, a pair of resilient rings 55, 56, FIG. 3, such as of rubber, may be used to retain tube 46 in a fixed position in hole 12. That is, the rings 55, 56 encircle object tube 46 and abut against the outside of tube 11 to retain the object tube 46 in fixed position in tube 11.

In operation, the user now picks up the assembled kaleidoscope 10 and object tube 46 (FIG. 3) and looks through eyehole 14. The light bulb 32 lights when the kaleidoscope 10 is picked up due to the action of mercury switch 35. The display presented to the viewer is dazzling and exciting, self-lighted, and continually changing due to the movement of the particles 48 to 51 and beads 52 in liquid 47. If desired, rings 55, 56 can be removed and the object tube 46 moved within hole 12 to vary the scene. When the kaleidoscope 10 is laid down, the mercury switch 35 shuts off light bulb 32.

Although eyehole 14 is shown as circular in FIG. 1, it can be of any desired configuration. For example, end cap 13 in FIG. 1 may be replaced by end cap 57 in FIG. 8 having a tear drop shaped opening 58 therethrough. The eye opening may be triangular (opening 60) as seen in end cap 59 in FIG. 9.

The triangular shape of mirror assembly 15 is preferably an isosceles triangle in cross section with an apex angle of about 18° to 24° (in both embodiments of FIGS. 4 and 5). Bulb 32 is of course replaceable as are battery or batteries 34. Any suitable batteries and electrical connection to bulb 32 may be used.

Tube 11, as heretofore discussed, can be of an acrylic material, brightly colored on the exterior, or covered by fabric or ceramic or the like. The mirrors of assembly 15 may be about 0.050" thick and tube 11 may be about 10-14" in overall length and about 1.50-3" in diameter. Object tube 46 may be about 0.81" in diameter and about 10" long. Hole 12 is of course a diameter slightly greater than that of object tube 46. Obviously, other object tubes, having differently dispersed particles of different colors and themes, can be inserted through hole 12. Beads 52 may be extremely small in outer diameter such as 0.060".

The end caps 13, 45 may also be of plastic, preferably opaque. It can be seen that there is disclosed a kaleidoscope which is portable, may be self-lighting, or may use ambient light entering from the side, does not require an on-off switch for the lighting, can use a number of separate object tubes of varying designs and styles and presents an exciting and visually appealing and constantly changing image. The object tube, having phosphorescent particles therein, can be held near a light source, such as an ordinary light bulb, for a predetermined period of time, such as an hour, then used in the dark, without the light bulb if desired, as by unscrewing end cap 45 and removing the same, and present an exciting phosphorescent display.

Figure 10:
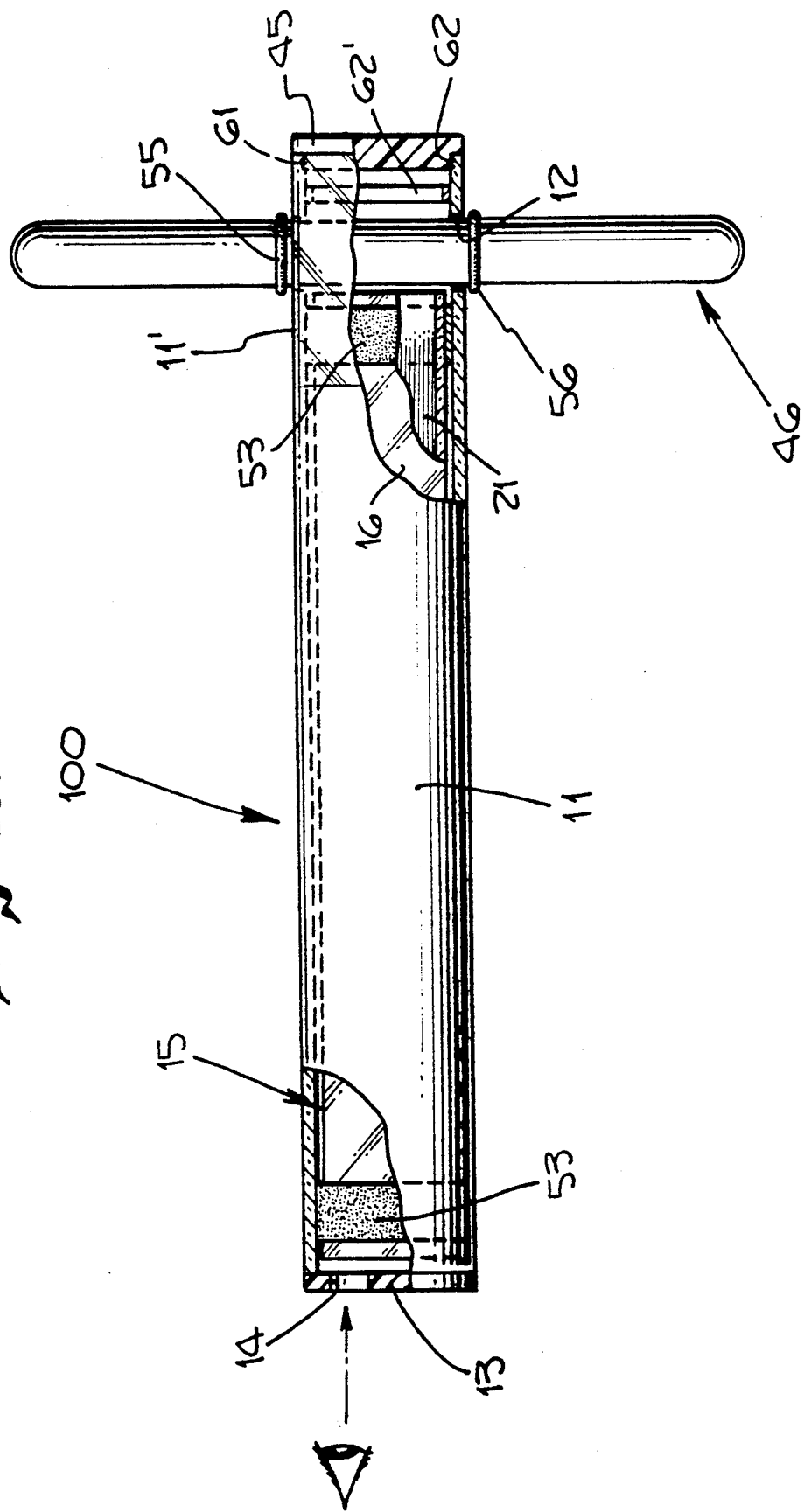
FIG. 10 is a view similar to FIG. 3 showing a kaleidoscope using ambient light.

Cap 45 can have threads 61 (FIG. 10) thereon adapted to mate with like threads 62 (FIG. 3) on the interior of wall 54 of tube 11 to make the lighting assembly 28 easily removable for replacement (or removal) of bulb 32 and batteries 34. As seen in FIG. 10, a kaleidoscope 100 is shown otherwise identical to kaleidoscope 10 but using ambient light. Like numerals this refers to like parts of the kaleidoscope of FIGS. 1 to 3. Thus, light assembly 28 has been eliminated and the rear portion 11' of tube 11 is transparent allowing ambient light to enter into the kaleidoscope 100. This can be easily accomplished by not painting this portion of tube 11. Clear ambient light thus enters from the side. The invention herein thus utilizes reflective, opaque and semitransparent materials, with lighting from either the side [ambient] or in front of the objects to be viewed [artificial light].

It can be seen that the kaleidoscope herein is novel and entertaining and presents sufficient diversity of views to be eternally pleasing.

We claim:
1. A kaleidoscope comprising:
   an elongated hollow generally tubularly shaped housing comprised of a generally cylindrical wall open at both ends;

a first end cap closing off one open end of said tubularly shaped housing;

a mirror assembly mounted internally of said housing being triangularly configured with a central triangularly shaped viewing channel extending down through the interior of said assembly, said assembly being comprised of a plurality of mirrors, at least two of said mirrors being silvered on the inside, said first end cap having an opening therethrough aligned with said viewing channel;

said housing having a hole through said generally cylindrical wall, said mirror assembly extending from a point adjacent said first end cap to a point adjacent to but terminating before said hole;

a second opaque end cap closing off the other open end of said housing; and an elongated object tube removably mounted in said hole and reciprocal along an axis extending generally normal to the longitudinal axis of said housing, said tube being transparent and having a closed off interior filled with a clear transparent viscous fluid having a plurality of discrete particles floating therein.

2. In the kaleidoscope of claim 1 wherein the discrete particles in said object tube are of a metallic reflective material.

3. In the kaleidoscope of claim 1 including a plurality of small glass beads dispersed in said fluid.

4. In the kaleidoscope of claim 3 wherein said beads are about 0.060–0.025" in outer diameter.

5. In the kaleidoscope of claim 3 wherein said beads are of colored glass material.

6. In the kaleidoscope of claim 1 wherein said viscous fluid is mineral oil.

7. In the kaleidoscope of claim 1 wherein said particles are of a phosphorescent material.

8. In the kaleidoscope of claim 1 including a light assembly mounted in the other open end of said housing adapted to provide light in the interior of said housing.

9. In the kaleidoscope of claim 8 wherein said light assembly is gravity actuated being normally unlighted when said housing is in a horizontal position and being lighted when said housing is in a position other than horizontal.

10. In the kaleidoscope of claim 9 wherein said light assembly is battery operated.

11. In the kaleidoscope of claim 9 wherein said light assembly includes a gravity actuated mercury switch.

12. In the kaleidoscope of claim 9 wherein said light assembly has a first extension portion extending into the interior of said housing on one side of said mirror assembly having a light socket with a removable light bulb therein, and a battery housing on said light assembly extending into the interior of the housing having at least one removable battery thereon, and a mercury switch mounted on said light assembly and being electronically connected to said light bulb socket and said battery housing.

13. In the kaleidoscope of claim 1 wherein said discrete particles are of differing masses and configurations so that said particles move up and down in diverse directions.

14. In the kaleidoscope of claim 1 wherein said housing is opaque substantially throughout.

15. In the kaleidoscope of claim 14 wherein said housing is substantially opaque throughout except for a transparent portion on at least one side of said hole.

16. In the kaleidoscope of claim 15 wherein said housing has a transparent portion on both sides of said hole.

17. In the kaleidoscope of claim 1 wherein said opening through said first end cap is round.

18. In the kaleidoscope of claim 1 wherein said opening through said first end cap is generally tear-drop shaped.

19. In the kaleidoscope of claim 1 wherein said opening through said first end cap is generally triangularly shaped.

20. In the kaleidoscope of claim 1 wherein said triangularly configured mirror assembly is in the form of an isosceles triangle, the apex of said triangle making an angle between about 18° to 24°.

21. In the kaleidoscope of claim 1 wherein said at least two mirrors form the legs of said triangle, the base of said triangle being blackened on both sides.

22. In the kaleidoscope of claim 1 wherein said isosceles triangle has a base and a pair of legs extending from the base to the apex of said triangle, said legs and base being silvered on the interior.

23. In the kaleidoscope of claim 1 including a first resilient ring extending about the exterior of said object tube adjacent said hole and a second resilient ring extending about the exterior of said object tube adjacent said hole opposite said first resilient ring, said rings being adapted to maintain said object tube in a preset position in said hole.

24. In the kaleidoscope of claim 1 wherein said object tube is of acrylic material.

* * * * *

REEXAMINATION CERTIFICATE (1945th)
United States Patent [19]
Eilrich et al.

[11] B1 5,029,954
[45] Certificate Issued Mar. 9, 1993

[54] KALEIDOSCOPE

[75] Inventors: Mark W. Eilrich, Sonora, Calif.; Hazel O. Baker, Bethesda, Md.

[73] Assignee: Wildewood Creative Products, Sonora, Calif.

Reexamination Request:
No. 90/002,813, Aug. 10, 1992

Reexamination Certificate for:
Patent No.: 5,029,954
Issued: Jul. 9, 1991
Appl. No.: 607,373
Filed: Oct. 31, 1990

[51] Int. Cl.$^5$ ............................................. G02B 23/00
[52] U.S. Cl. ........................................ 359/617; 353/2
[58] Field of Search .................... 359/616, 617; 353/1, 353/2

[56] References Cited
U.S. PATENT DOCUMENTS
3,020,796  2/1962  Kaplan ............................. 359/616

OTHER PUBLICATIONS
Wildewood Creative Products 1990 Fall Catalog.

*Primary Examiner*—Richard A. Wintercorn
*Attorney, Agent, or Firm*—Pomes, Smith, Lande, & Rose

[57] ABSTRACT

A kaleidoscope having a removable object tube with inner elongated mirrored planar surfaces. The object tube is of a transparent solid material filled with a clear transparent viscous liquid with a plurality of contrasting color discrete particles therein.

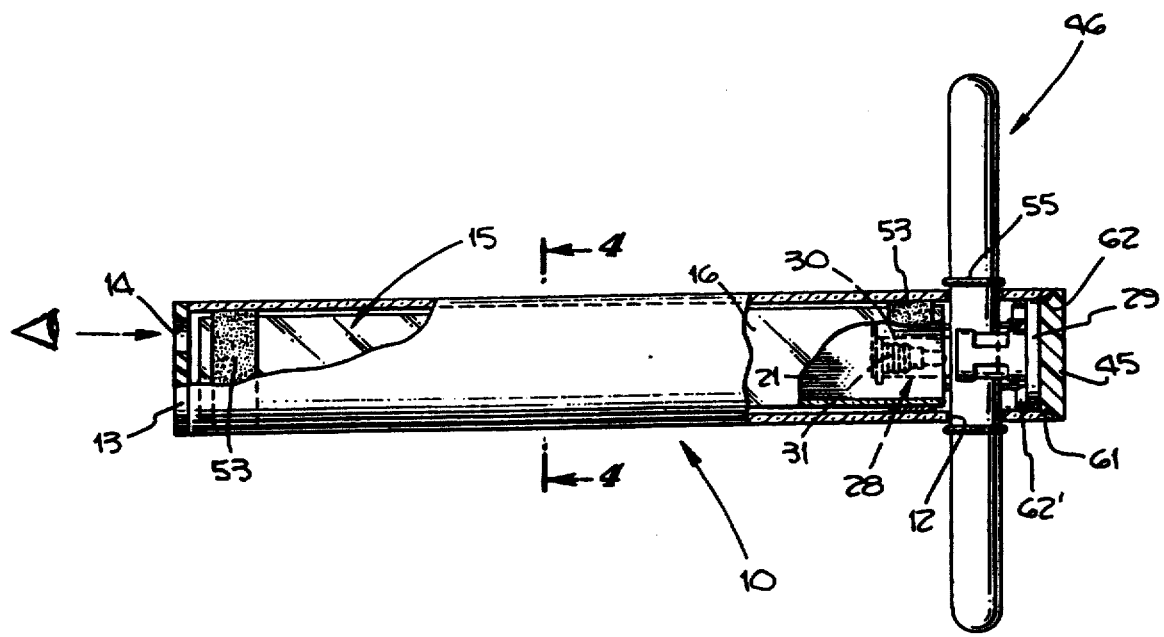

REEXAMINATION CERTIFICATE ISSUED UNDER 35 U.S.C. 307

THE PATENT IS HEREBY AMENDED AS INDICATED ABOVE.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-7, 9-12 and 14-16 are cancelled.

Claims 8, 13 and 17-24 are determined to be patentable as amended.

8. [In the kaleidoscope of claim 1 including] *A kaleidoscope comprising:*

*an elongated hollow generally tubularly shaped housing comprised of a generally cylindrical wall open at both ends;*

*a first end cap closing off one open end of said tubularly shaped housing;*

*a mirror assembly mounted internally of said housing being triangularly configured with a central triangularly shaped viewing channel extending down through the interior of said assembly, said assembly being comprised of a plurality of mirrors, at least two of said mirrors being silvered on the inside, said first end cap having an opening therethrough aligned with said viewing channel;*

*said housing having a hole through said generally cylindrical wall, said mirror assembly extending from a point adjacent said first end cap to a point adjacent to but terminating before said hole;*

*a second opaque end cap closing off the other open end of said housing;*

*an elongated object tube removably mounted in said hole and reciprocal along an axis extending generally normal to the longitudinal axis of said housing, said tube being transparent and having a closed off interior filled with a clear transparent viscous fluid having a plurality of discrete particles of a reflective material floating therein; and*

*a light assembly mounted in the other open end of said housing adapted to provide light in the interior of said housing, said light assembly being gravity actuated being normally unlighted when said housing is in a horizontal position and being lighted when said housing is in a position other than horizontal, said light assembly having a first extension portion extending into the interior of said housing on one side of said mirror assembly having a light socket with a removable light bulb therein, and a battery housing on said light assembly extending into the interior of the housing having at least one removable battery thereon, and a mercury switch mounted on said light assembly and being electronically connected to said light bulb socket and said battery housing, said light bulb extending toward said object tube between said object tube and said mirror assembly.*

13. In the kaleidoscope of claim [1] *8* wherein said discrete particles are of differing masses and configurations so that said particles move up and down in diverse directions.

17. In the kaleidoscope of claim [1] *8* wherein said opening through said first end cap is round.

18. In the kaleidoscope of claim [1] *8* wherein said opening through said first end cap is generally tear-drop shaped.

19. In the kaleidoscope of claim [1] *8* wherein said opening through said first end cap is generally triangularly shaped.

20. In the kaleidoscope of claim [1] *8* wherein said triangularly configured mirror assembly is in the form of an isosceles triangle, the apex of said triangle making an angle between about 18° to 24°.

21. In the kaleidoscope of claim [1] *8* wherein said at least two mirrors form the legs of said triangle, the base of said triangle being blackened on both sides.

22. In the kaleidoscope of claim [1] *8* wherein said isosceles triangle has a base and a pair of legs extending from the base to the apex of said triangle, said legs and base being silvered on the interior.

23. In the kaleidoscope of claim [1] *8* including a first resilient ring extending about the exterior of said object tube adjacent said hole and a second resilient ring extending about the exterior of said object tube adjacent said hole opposite said first resilient ring, said rings being adapted to maintain said object tube in a preset position in said hole.

24. In the kaleidoscope of claim [1] *8* wherein said object tube is of acrylic material.

* * * * *